United States Patent [19]
Love

[11] 3,788,477
[45] Jan. 29, 1974

[54] TREATMENT APPARATUS

[76] Inventor: Leonard Sidney Love, 1457 Glen Rutley Cir., Mississauga, Ontario, Canada

[22] Filed: July 19, 1971

[21] Appl. No.: 163,907

[52] U.S. Cl. .............................. 210/195, 210/525
[51] Int. Cl. ...................... B01d 21/04, B01d 21/18
[58] Field of Search... 210/194, 3, 14, 15, 207, 208, 210/221, 320, 519, 521, 523, 197, 195; 261/123

[56] References Cited
UNITED STATES PATENTS

| | | | |
|---|---|---|---|
| 2,574,685 | 11/1951 | Baxter et al. | 210/221 UX |
| 3,669,422 | 6/1972 | Nogaj | 210/242 |
| 2,801,007 | 7/1957 | Thompson | 210/3 |
| 3,313,422 | 4/1967 | Swenson | 210/523 |
| 3,666,112 | 5/1972 | Pielkanrood | 210/521 |
| 3,615,025 | 10/1971 | Rice et al. | 210/521 |
| 1,738,362 | 12/1929 | Downes | 210/523 |
| 3,152,982 | 10/1964 | Pagnotti | 210/14 X |
| 1,642,206 | 9/1927 | Imhoff | 210/199 X |

Primary Examiner—Samih N. Zaharna
Assistant Examiner—T. A. Granger
Attorney, Agent, or Firm—Rogers, Bereskin & Parr

[57] ABSTRACT

Treatment apparatus for aerating or mixing, and clarifying, liquids such as industrial and sanitary waste waters and for conducting chemical reactions, in which an aeration or mixing basin and a clarifier are formed as one integral unit, separated by a baffle. Flow from the aeration basin into the clarifier is limited by flow control plates. The clarifier has a bottom which slopes toward the aeration basin bottom, so that solids settling in the clarifier flow down the clarifier bottom towards the aeration basin, where they are picked up by circulation in the aeration basin and re-suspended. A sludge scraper scrapes the clarifier bottom periodically to dislodge sludge adhering to the bottom, and a scum skimmer skims the clarifier surface periodically to remove scum.

5 Claims, 22 Drawing Figures

INVENTOR.
LEONARD SYDNEY LOVE
BY Rogers, Bereskin & Parr

INVENTOR.
LEONARD SYDNEY LOVE
BY Rogers, Bereskin & Parr 3,788,477

TREATMENT APPARATUS

This invention relates to treatment apparatus suitable for processing waste waters such as municipal sewage, industrial waste waters and other liquids by the activated sludge process. The invention may also be used in other types of chemical processes, as will be described.

In the activated sludge treatment of waste water, micro organisms (called activated sludge) are encouraged to feed on organic material in the waste water in the presence of air (oxygen). The products of this process are carbon dioxide, water, and additional micro organisms or activated sludge. The process, since it requires oxygen, is usually carried out in a reaction vessel called an aeration basin, where the mixture of waste water and activated sludge is aerated. After aeration, the sludge mass is separated from the waste water by settling in a device called a clarifier. The purified waste water is discharged as treated effluent while some of the activated sludge is recycled back to the aeration basin for re-use.

In conventional activated sludge treatment plants, the clarifier in which the sludge mass is separated from the waste water is completely separate from the aeration basin, and an external sludge recirculation pump is necessary to recycle the sludge from the clarifier back to the aeration basin. This system has a number of disadvantages. Firstly, there is a long delay between the time when the activated sludge leaves the aeration basin and the time it is returned from the clarifier back to the aeration basin. During this period the activated sludge is not performing any useful function, and this long delay results in an inefficient system. Secondly, large pumps are required to recirculate adequate quantities of activated sludge. Desirably the sludge recirculation rate should be higher than the total flow rate through the plant, but large sludge recirculation pumps are so costly that this is not usually economically feasible. In general, the multiple structures, piping, valves, controls, pumps, etc. required by a separate clarifier and an external pumping system causes high land, construction, and mechanical equipment costs. Finally, in a conventional system the plant operator must continuously regulate the amount of sludge in the system, and this requires complicated testing and operational procedures, leading to high operational costs.

Because of these disadvantages, various prior attempts have been made to combine the clarifier with the aeration basin. However, so far as the applicant is aware, all of the prior art systems have been extremely high in capital and operating costs and all have tended to accumulate quantities of unaerated sludge which then turns anaerobic (i.e. it begins to nitrify in the absence of oxygen), floats to the surface, and contaminates the effluent.

Accordingly, it is an object of the present invention in one of its aspects to provide apparatus which combines the aeration basin and clarifier in one unit, and which is relatively low in both capital and operating costs, and in which unaerated sludge will not accumulate unduly. According to the present invention in a preferred embodiment, at least a portion of the bottom of the clarifier slopes towards the aeration basin, and a sludge scraper scrapes the bottom of the clarifier periodically to loosen any sludge accumulating and move such sludge to the aeration basin, where it is picked up by the circulation in the aeration basin and aerated. In a preferred embodiment a scum skimmer is also provided to remove scum at the top of the clarifier. With the invention, savings of about 20% in equipment capital cost and 30% in land cost can typically be achieved, and in some circumstances the savings may be of the order of 50% of the cost of a conventional system.

Further objects and advantages of the invention will appear from the following description, taken together with the accompanying drawings, in which.

Figure 1:
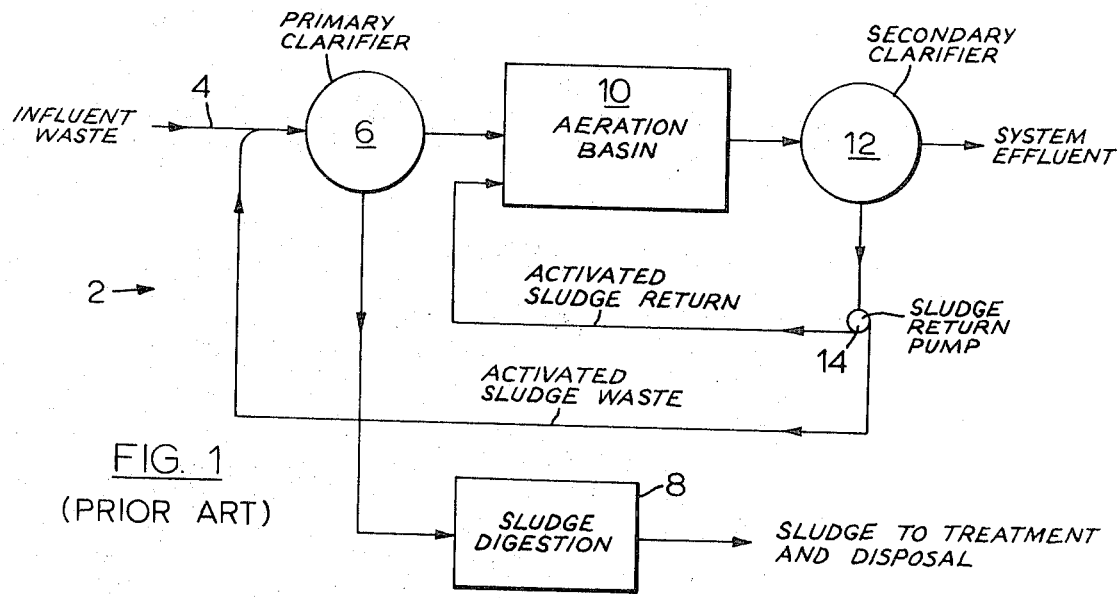
FIG. 1 is a schematic flow diagram of a conventional activated sludge treatment system.

Reference is first made to FIG. 1, which shows a conventional waste water treatment system 2 in which influent waste water is conducted through conduit 4 to a primary clarifier 6, where primary settling of solids occurs. The settled solids are removed to a sludge digester 8, and the digested sludge is removed from treatment and disposal. The effluent from the primary clarifier 6 is directed to an aeration basin 10 where it is treated with activated sludge, which removes the organic materials from the waste water. The effluent from basin 10 is directed to a secondary clarifier 12 where the activated sludge settles. Some of the settled sludge is returned by sludge pump 14 to the aeration basin 10, and the excess sludge is pumped by pump 14 into the primary clarifier 6 where it settles and is removed.

As previously discussed, after the activated sludge leaves the aeration basin 10, a long period of time occurs before it settles in the secondary clarifier 12 and can be returned to the aeration basin 10. This results in inefficient operation. In addition, the sludge return pump 14 is costly and of limited capacity, and the quantities of sludge returned to the aeration being and removed as excess must be continuously regulated.

Figure 2:
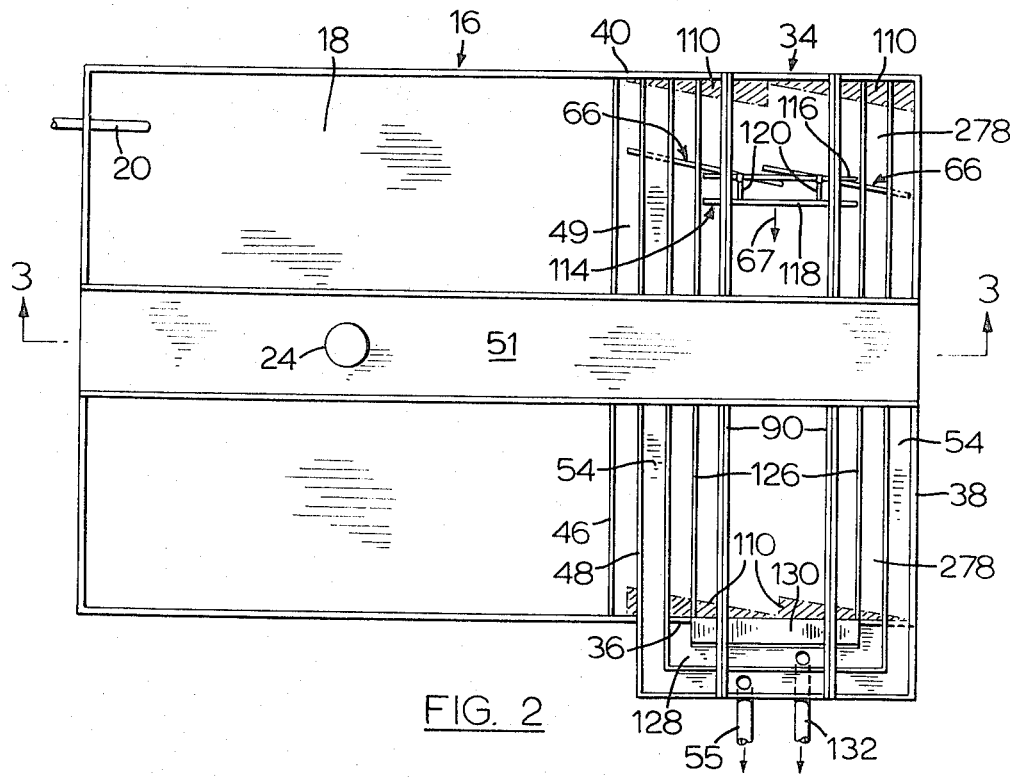
FIG. 2 is a top plan view of a combined aeration basin and clarifier according to the present invention.
Figure 3:
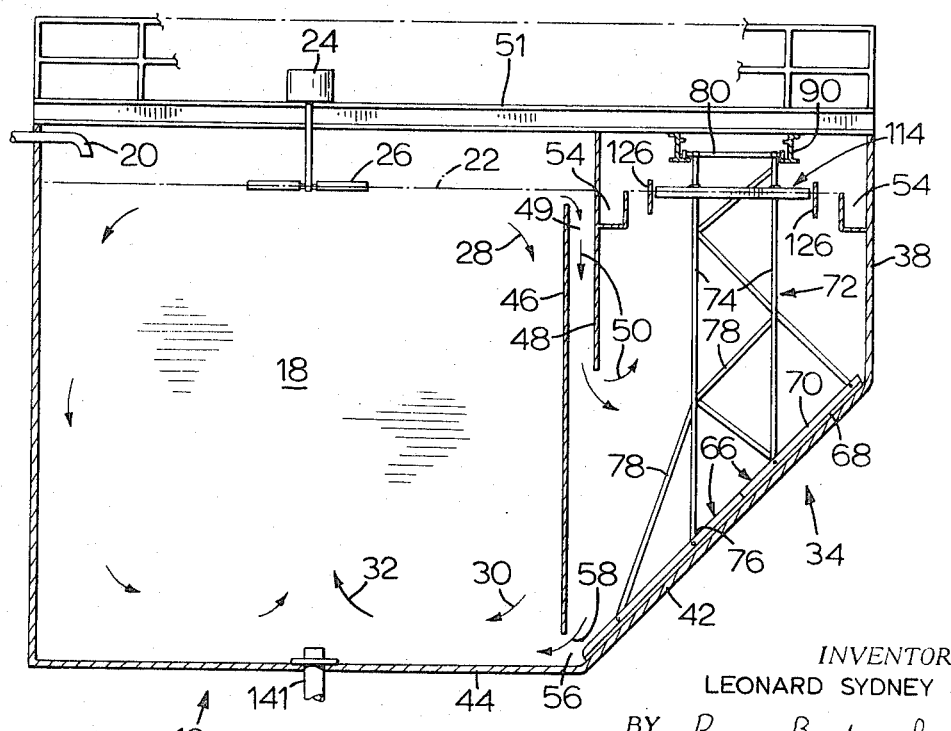
FIG. 3 is a sectional view taken along lines 3—3 of FIG. 2.

As shown in FIGS. 2 and 3, the invention eliminates the external pumping system by combining the clarifier with the aeration basin as one integral unit 16. The unit 16 includes an aeration basin 18 that is generally square or rectangular as viewed from above and from the side. Influent from the primary clarifier 6 enters the aeration basin 18 via conduit 20, and the water level in basin 18 is maintained at level 22. A standard mechanical aerator diagrammatically indicated at 24 is provided, having an impeller 26 located at or near the water level 22. The impeller 26 establishes a flow pattern as indicated by arrows 28, 30, 32, in which the liquid travels generally radially outwardly and horizontally from the impeller, down the sides of the aeration basin, and generally horizontally and radially back to the centre of the aeration basin and then upwardly again to the impeller. The mechanical aerator may typically be a surface aerator of the type sold by the Greey Mixing Company, of Rochester, N.Y. under its model No. LAR 150.

The unit 16 further includes a clarifier 34 formed integrally with the aeration basin 18. The clarifier 34 is generally rectangular as viewed from above and includes three side walls 36, 38, 40 and a bottom 42 which slopes downwardly at an angle of between 20° and 60° from the horizontal towards the bottom 44 of the aeration basin.

The fourth side wall of the clarifier is formed by a pair of vertical baffles 46, 48, which divide the clarifier from the aeration basin. Baffle 46, which may be termed the clarifier outer baffle, extends from just below the water level 22 to a position just above the bottom 44 of the aeration basin. Baffle 48, which may be termed the inner clarifier baffle, is located on the clarifier side of outer baffle 46, and extends from substantially above the water level 22 to a position substantially below the water level 22. The two baffles form a vertically oriented passage 49 between them through which water from the aeration basin, driven by the impeller 26, may flow (as indicated by arrows 50) into the clarifier. Baffles 46, 48 may be supported by securing their edges to the sides of the clarifier, or if preferred, baffle 46 may be supported on spaced vertical posts extending to the clarifier-aeration basin bottom, and baffle 48 may be suspended from the walkway 51 of the unit and from baffle 46.

When water from the aeration basin 18 enters the comparatively quiet clarifier 34, activated sludge from the water settles onto the bottom 42 of the clarifier, while the clarified water at the surface leaves the apparatus via launders 54 and an effluent conduit 55. The settled sludge slides down the sloping clarifier bottom 42 into the space 56 between the bottom of baffle 46 and the bottom 44 of the aeration basin 18. At this point, the settled sludge is picked up by the currents in the aeration basin and by the liquid flowing down the clarifier side of baffle 46 (indicated by arrow 58) and is returned to circulation in the aeration basin.

Figure 4A:
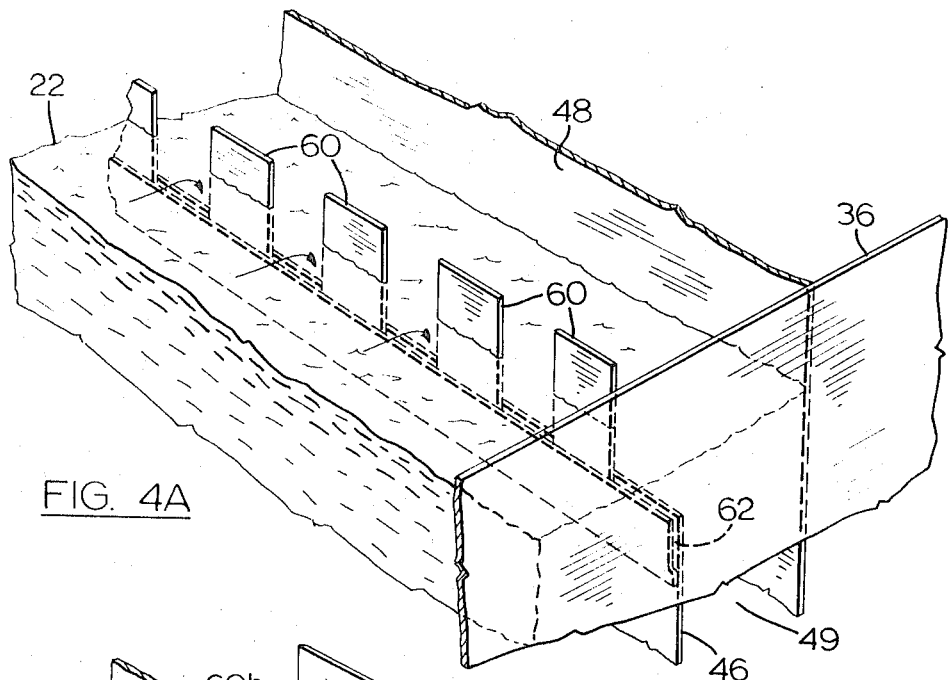
FIG. 4A and 4B are perspective views of two kinds of flow control plates that may be used in the FIG. 2 and 3 apparatus.
Figure 4B:
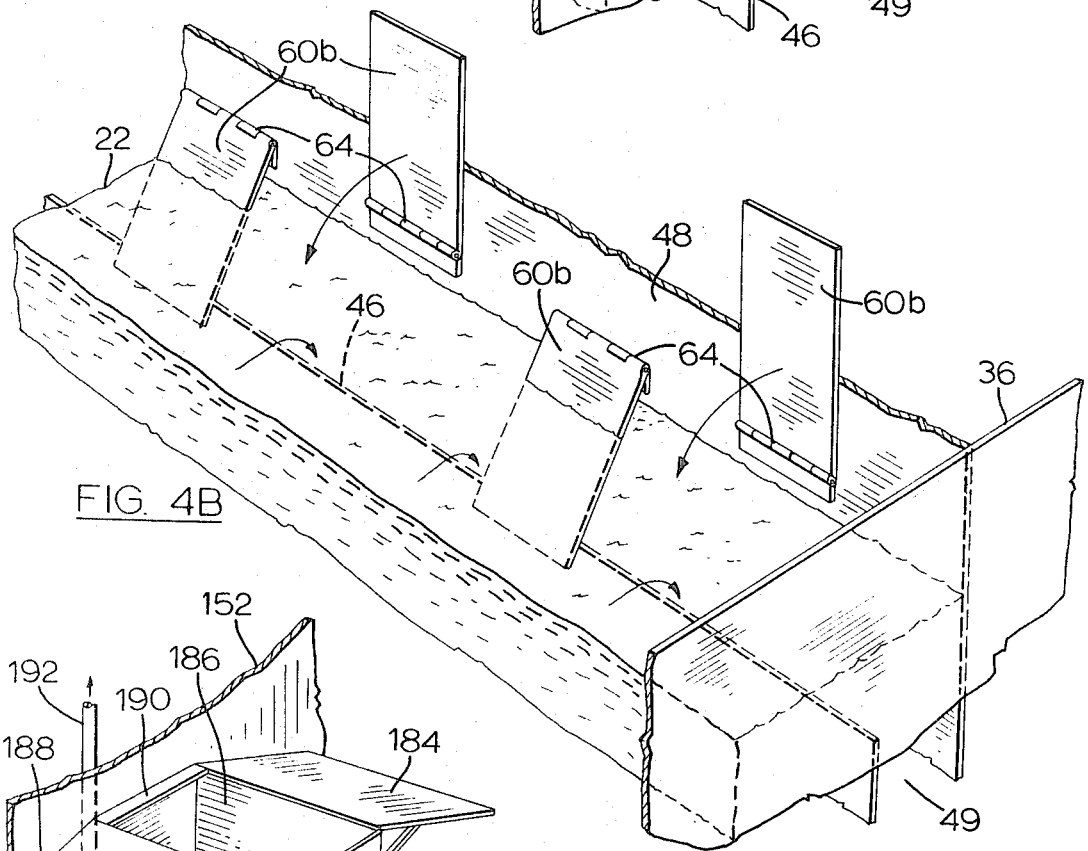

The water level in the device is regulated by the height of the sides of launders 54, and the flow into the clarifier is controlled by flow control plates placed at the top of baffle 46. As shown in FIG. 4A, such flow control plates typically are simple plates 60 resting in a slot 62 at the top of baffle 46. Alternatively, as shown in FIG. 4B, the flow control plates 60b may be hinged at 64 to the baffle 48 at a position above the water level 22, so that any desired number of the flow control plates can be swung downwardly to rest on the top of baffle 46, as shown for two of the plates 60b in FIG. 4B. In this position the flow of liquid between the baffles will hold plates 60b in a position in which they will obstruct liquid flow.

It has been found with pilot models of the invention that despite the sloping bottom 42 of the clarifier, sludge tends gradually to accumulate on the bottom 42. Such accumulated sludge begins to nitrify (i.e. in the absence of oxygen it generates nitrogen), and the accumulated nitrogen floats the nitrified sludge to the surface where it exists via launders 54, contaminating the effluent. Accordingly, the invention provides a sludge scraper which periodically scrapes accumulated sludge from the clarifier bottom 42. The sludge scraper includes a pair of overlapping scraper blades 66 (FIGS. 2, 3) which travel along the bottom 42 in the direction of arrow 67 and are set at an angle to the direction of travel so as to tend to push sludge downwardly as the scraping blades 66 travel forwardly. The scraper blades 66 typically include replaceable flexible squeegees 68 (made of plastic or of the rubber sold under the trade mark Neoprene) held in metal or plastic holders 70 and rubbing against the bottom 42 of the clarifier. It will be seen (FIGS. 2, 3) that the scraper blades 66 extend beneath the passage 49.

Figure 5:
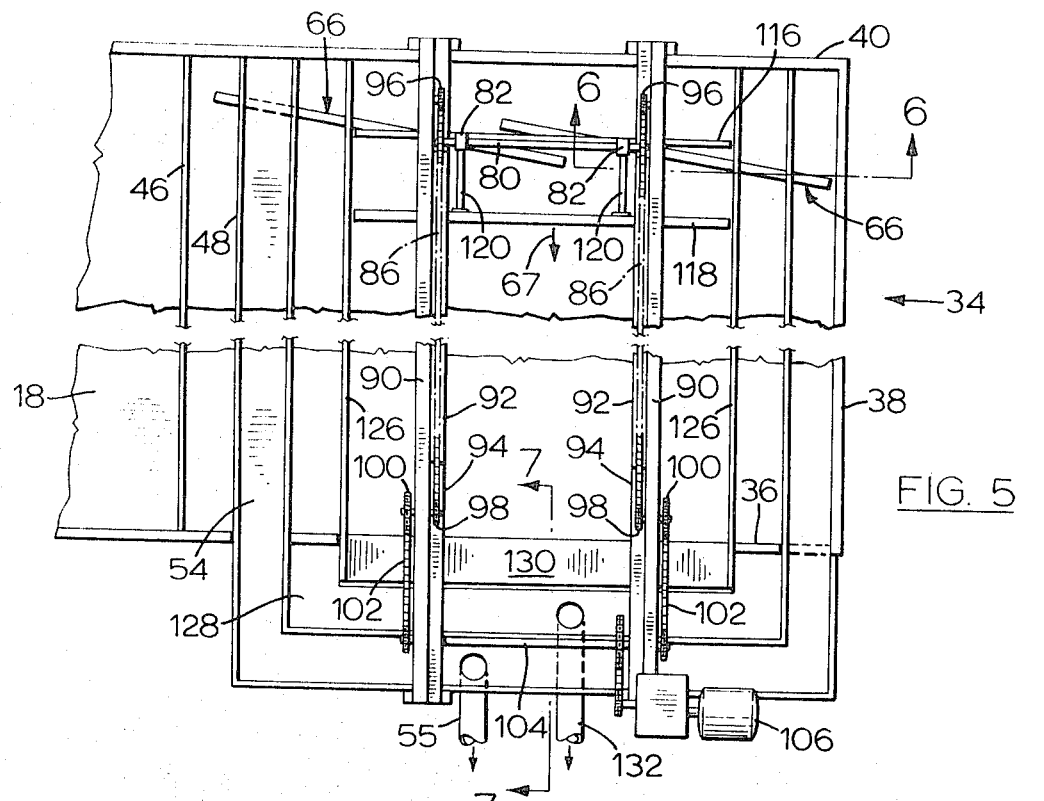
FIG. 5 is a top plan view of the clarifier of FIGS. 2 and 3, showing details of the drive for the sludge scraper and scum skimmer.
Figure 7:
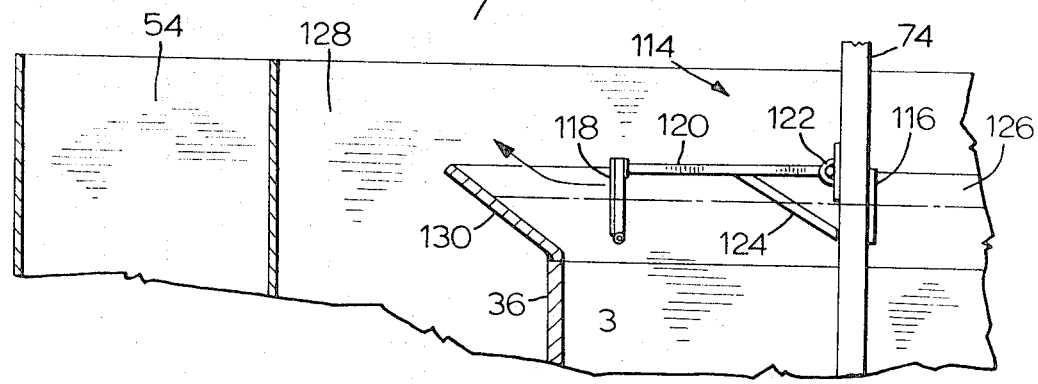
FIG. 7 is a side view, partly in section, showing in detail the scum skimmer mechanism.
Figure 6:
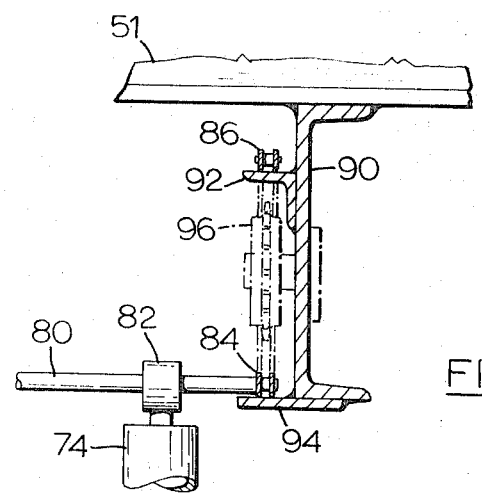
FIG. 6 shows further details of the mounting mechanism and drive for the sludge scraper and scum skimmer.

The scraper blades 66 are secured to an upright support structure 72. The support structure 72 is typically formed from vertical structural members 74 (which may be of metal or plastic) attached at 76 to the blade holders and also attached to transverse reinforcing members 78. As shown in FIGS. 5 to 7, the vertical members 74 are hinged at their tops to a transverse metal rod 80, by means of bearing sleeves 82. Metal rod 80 is attached to opposed links 84 of two spaced parallel continuous chains 86.

The chains 86 run the length of the clarifier 34 and are supported from the walkway 51 which extends along the top of the unit. Specifically, a pair of parallel spaced angle irons 90 are welded to the underside of the walkway 88 and extend along the length of the top of the clarifier. Upper and lower flanges 92, 94 are welded to each angle iron 90 and face the flanges 92, 94 of the opposed angle iron 90. The flanges 92, 94 serve to support the upper and lower runs of the chains 86. (The chains move very slowly so that wear is not a significant problem.)

The chains 86 extend around idler sprockets 96 (FIG. 5) at one side of the clarifier and around driver sprockets 98 at the other side. The sprockets 98 are connected to larger sprockets 100 which in turn are driven by chains 102 from a shaft 104 driven by a gear motor 106.

In this manner, the sludge scraper blades 66 are driven slowly along the bottom 42 of the clarifier 34 in the direction of arrow 67 (at right angles to the "fall line" of the bottom 42), and when the scraper assembly reaches sprockets 98, it is lifted upwardly as links 84 move upwardly over sprockets 98, and the scraper assembly then travels back to the idler sprockets 96 with the blades 66 suspended above the bottom of the clarifier. The scraper assembly is then lowered at sprockets 96 for another pass along the clarifier bottom. Because of hinges 82 and because of the low scraper speed, the scraper assembly at all times remains approximately vertical.

It will be noted from FIG. 2 that certain areas of the bottom 42 of the clarifier are not scraped by the scraper blades 66. These areas, indicated at 110, are filleted, i.e. they are made with a very steep slope so that any sludge that is deposited on them will flow downwardly to a position in which it will be picked up and returned to the aeration basin.

Typically the scraper blades travel at approximately three feet per minute.

In the preferred form of the invention, a scum skimmer 114 is attached to the support structure 72. The scum skimmer includes (see especially FIG. 7) a first vertical skimmer plate 116 extending between the upright members 74 of the support structure 72 tranverse to the direction of movement of the support structure, and also includes a second skimmer plate 118 located ahead of the plate 116. The plate 118 is supported by a pair of members 120 hinged at 122 to the vertical support members 74. Downward movement of the hinged skimmer plate 118 is limited by a stop 124. The scum skimmer plates 116, 118 move between a pair of scum baffles 126 (FIGS. 3, 5) extending along the clarifier and located at the sides of the clarifier near the launders 54. The baffles 126, which are secured to the sides 36, 40 of the clarifier, serve to confine any scum pushed by the scum skimmer plates. Since the baffles 126 are near the sides of the clarifier, most of the scum in the clarifier will rise between them.

To accommodate the scum removed by the scum skimmer, the unit 16 includes a scum box 128 located at one end of the clarifier. The scum box 128 extends vertically the entire height of the clarifier and is separated from the clarifier by the side wall 36. At the top of wall 36 is provided (FIG. 7) an upwardly sloping ramp 130. As the scum skimmer moves in the direction of arrow 68, the hinged plate 118 moves onto the ramp 130 and pushes the scum upwardly along the ramp and over its edge so that the scum can fall into the scum box 128. The scum skimmer is then lifted, as the entire assembly is raised, by the chains 86, and is carried back above the surface of the water in the unit to the idler sprocket 96 where the scum skimmer is lowered to again commence scum removal. Scum exits from the scum box 128 via a conduit 132 at its bottom.

When the FIGS. 1 to 7 embodiment is used for treatment of waste liquid, the bottom of the baffle 48 will usually be 6 feet or more below the liquid level 22. This provides a clarification zone that is at least 6 feet deep, which is the normally accepted minimum required for good clarification. In addition, the rate of flow of liquid into the clarifier should desirably be limited, because too high a rate of liquid flow will agitate the contents of the clarifier unduly, interfering with settling. Preferably the rate of flow of liquid into the clarifier is between one and two times the rate of liquid flow through the unit (i.e. the rate of flow of influent through conduit 20) and does not exceed twice the rate of liquid flow into the unit via conduit 20. (This is controlled by flow control plates 60 or 60b).

It will be seen that so long as influent is entering the unit 16, liquid flow from the aeration basin into the clarifier and flow of effluent from the clarifier occurs even without use of the impeller 26. In other words, the impeller 26 does not function as a pump to pump liquid through the device, but serves only to agitate and aerate the contents of the aeration basin so as to provide suspension of the solids therein, and to establish a circulation pattern which will pick sludge flowing into space 56 between the aeration basin and the clarifier. Space 56 will usually be at least two feet in height to ensure that the sludge will pass therethrough and be picked up. Since the impeller is selected primarily on the basis of its mixing ability, it can be selected to suspend any practical required amount of solids. If excess sludge is produced or if solids are to be removed, this is accomplished via a pipe 141 located at the centre of the aeration basin, below the impeller 26. Flow of material (liquid and solids) through pipe 141 is controlled by conventional valves and (if necessary) a pump, not shown.

Figure 8:
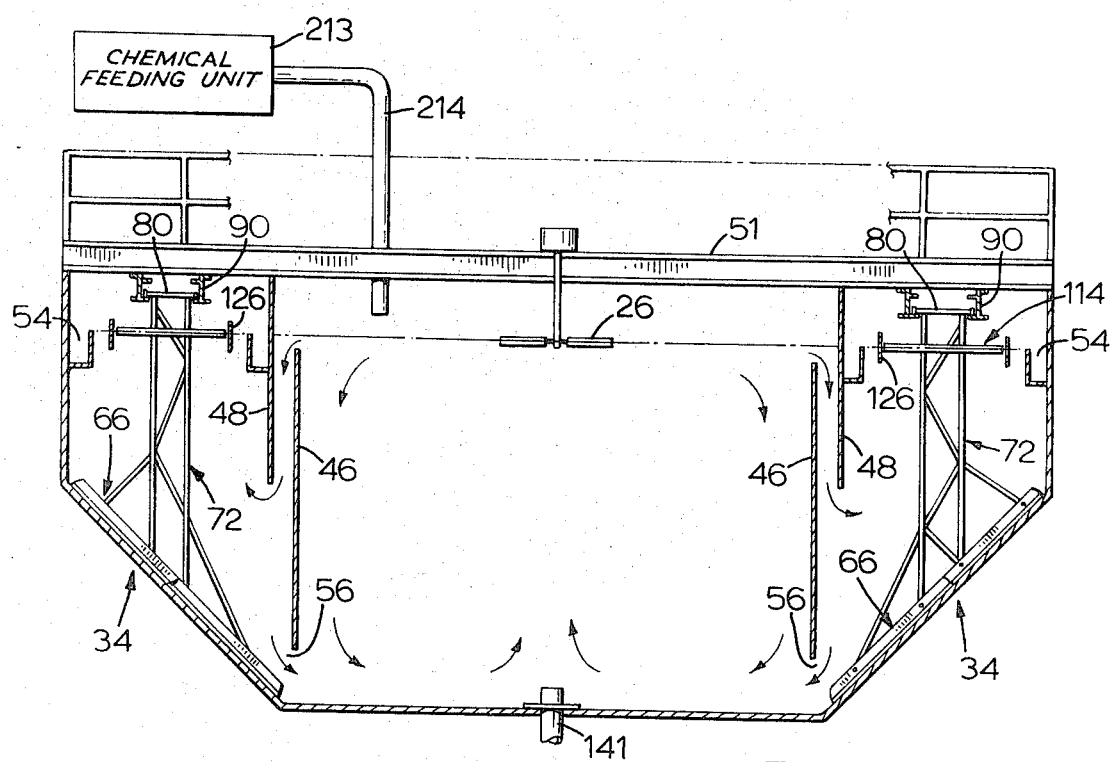
FIG. 8 is a side sectional view of a modification of the FIGS. 2 and 3 apparatus.

In cases where a larger capacity is required, the aeration basin can be lengthened and a clarifier can be placed at each end of the aeration basin, as shown in FIG. 8, where corresponding reference numerals indicate parts corresponding to those of FIGS. 2 to 7. Both clarifiers 34 shown in FIG. 7 are identical. In fact, if desired, a third clarifier (identical to the others except for length) can be placed on a third side of the aeration basin 18. Since the third clarifier will not be beneath the walkway 88, other appropriate support structure will be used to support its sludge scraper and scum skimmer assemblies.

Figure 8A:
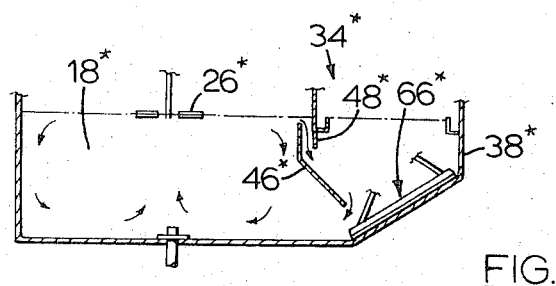
FIG. 8A is a side sectional view showing a portion of another modification of the FIGS. 2 and 3 apparatus.

As shown in FIG. 8A (where reference numerals with an asterisk indicate parts corresponding to those of FIGS. 2 to 8), additional clarification area can also be obtained by angling or curving baffle 46* inwardly towards the opposite side 38* of the clarifier. This allows greater clarifier width per foot of clarifier length, increasing the clarifier area that can be placed on each side of the aeration basin. The baffle 46* can be curved or it can be angled as shown, but its slope will preferably be steep enough (at least 60°) that it does not need a sludge scraper. The same sludge scraper and scum skimmer mechanism (not shown except for blades 66*) are provided for the FIG, 8A apparatus as for the apparatus previously described.

Figure 9:
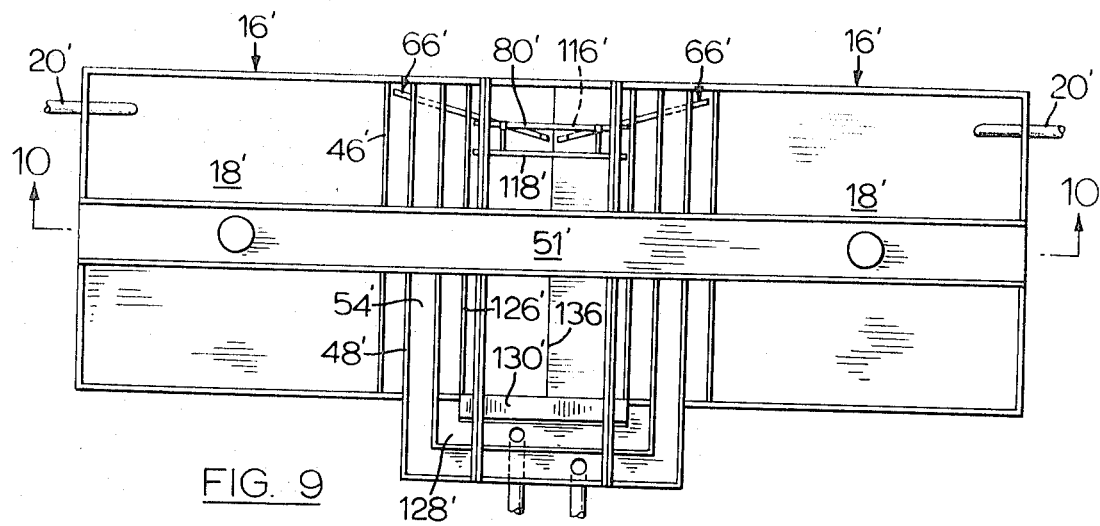
FIG. 9 is a top plan view of another modification of the FIGS. 2 and 3 apparatus.
Figure 10:
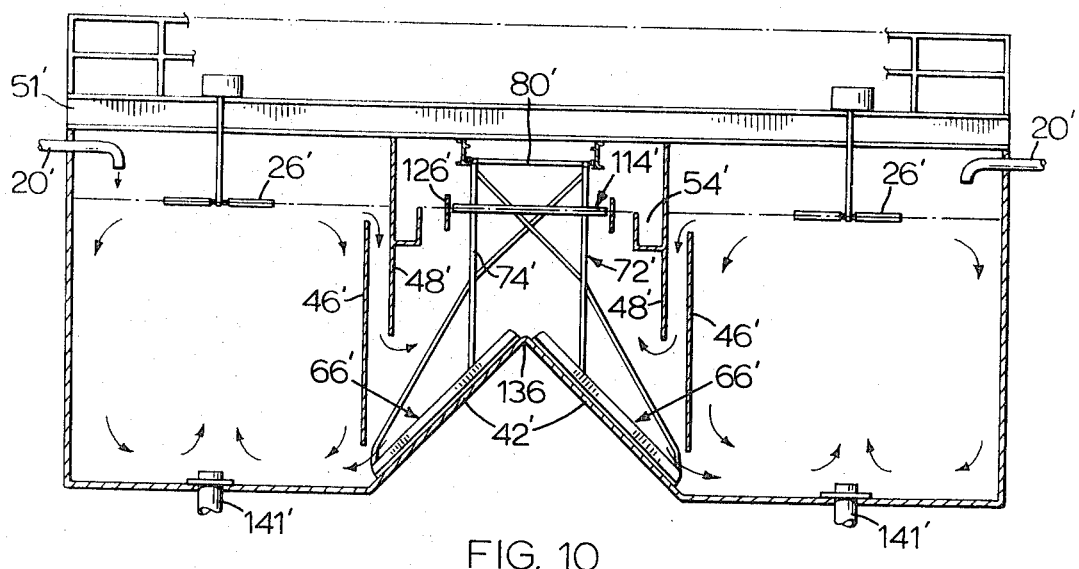
FIG. 10 is a sectional view taken along lines 10—10 of FIG. 9.

Another modification of the invention is shown in FIGS. 9 and 10, where primed reference numerals indicate parts corresponding to those of FIGS. 2 to 8. In the FIGS. 9 and 10 embodiment, two units 16' each consisting of an aeration basin and clarifier have been placed end to end, with the clarifiers of each combined into one clarifier 34'. The bottom of clarifier 34' consists of two adjoining sloping portions 42' meeting at edge 136 and forming a V configuration. With this arrangement, two sets of sludge scraper blades 66' are used, one for each sloping bottom portion 42', but only one vertical support structure 72' and one set of drive chains (not shown) are required to support and drive both sets of sludge scraper blades 66', and only one scum skimmer 114' is required for the common clarifier.

Figure 13:
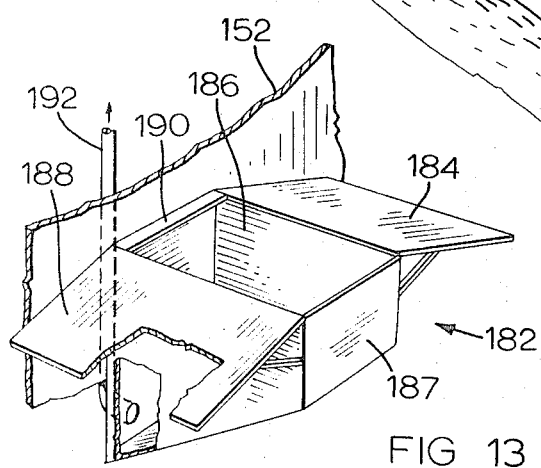
FIG. 13 is a perspective view of a scum box of the FIGS. 11 and 12 apparatus.
Figure 11:
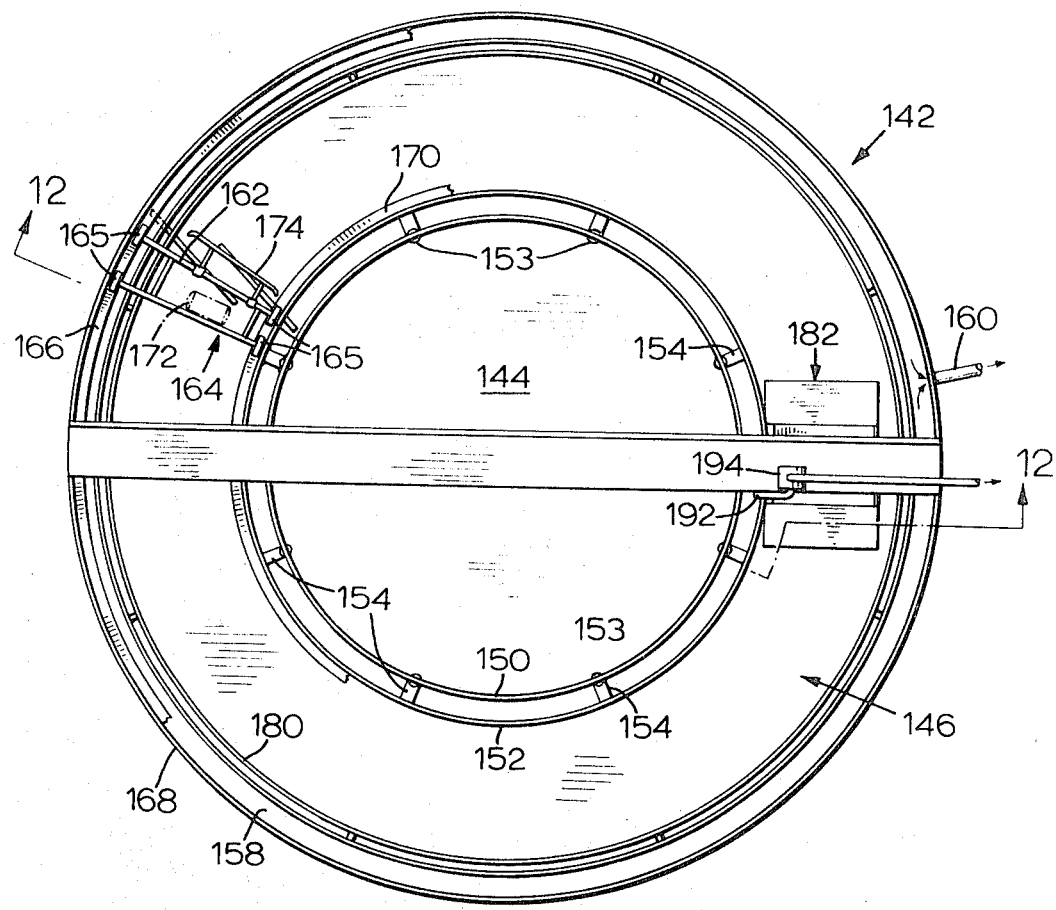
FIg. 11 is a top plan view of yet another modification of the FIGS. 2 and 3 apparatus.
Figure 12:
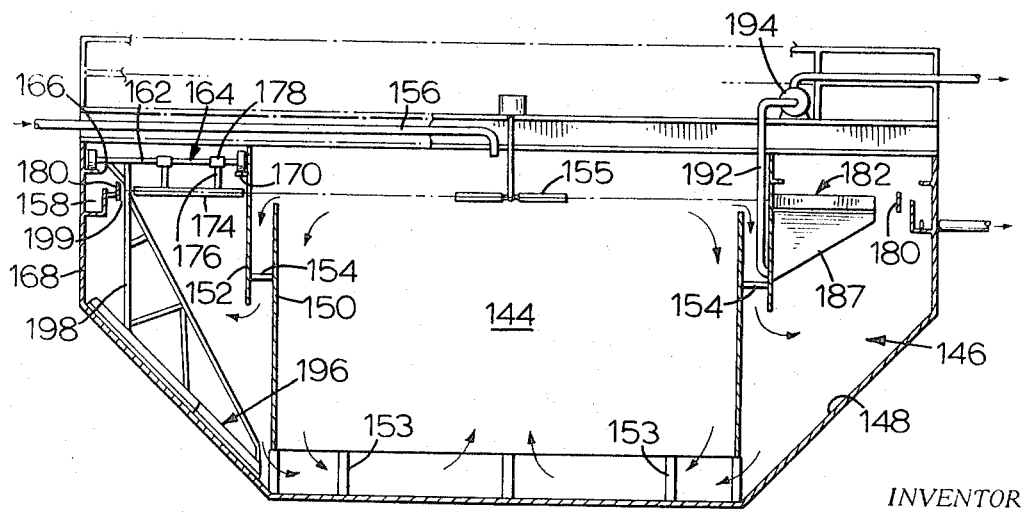
FIG. 12 is a sectional view taken along lines 12—12 of FIG. 11.

Reference is next made to FIGS. 11 to 13, which show the invention embodied in a circular unit 142.

The circular unit 142 includes a circular aeration basin 144 with an annular clarifier 146 extending around the aeration basin. The clarifier 146 includes a sloping bottom 148 corresponding to the bottom 42 of the clarifier in FIGS. 2 to 10, and includes a pair of baffles 150, 152 which separate the aeration basin from the clarifier and which correspond in function and structure to the baffles 46, 48 in the FIGS. 2 and 3 unit 16. Baffle 150 is suspended by spaced vertical posts 153 extending from the bottom of the aeration basin to the bottom of baffle 150, and baffle 152 is supported by struts 154 from baffle 150. The aeration basin 144 contains a mechanical aerator 155 which establishes the same circulation pattern as impeller 26 of FIG. 2. Influent enters the aeration basin 144 via conduit 156, and clarifier effluent leaves the clarifier via a circular launder 158 and conduit 160.

Apart from shape, the only substantial diference between the FIGS. 11 and 12 embodiment and those previously described is in the sludge scraper and scum skimmer mechanisms. In the FIGS. 11 and 12 embodiment, these mechanisms do not reciprocate but instead are supported by a horizontal transverse shaft 162 which forms part of and is supported by a carriage 164. The carriage 164 has four wheels 165 which run on tracks constituted by a horizontal flange 166 attached to the outer wall 168 of the clarifier and by an opposed horizontal flange 170 attached to the side of baffle 152. The carriage 164 is driven by a motor diagrammatically indicated at 172, which can be an electric motor driven by a storage battery (or energized through slip rings extending around the clarifier), or it can be an air motor driven by air stored in an air cylinder.

The scum skimmer in the FIGS. 11 and 12 embodiment comprises a skimmer plate 174 supported by members 176 which are hinged at 178 to the shaft 162, in essentially the same manner as shown for hinged skimmer plate 118 of FIG. 7. There is no fixed skimmer plate corresponding to plate 116 of FIG. 7. Downward movement of the hinged skimmer plate 174 is limited by a stop (not shown) incorporated in the hinges 178.

The skimmer plate 174 moves between baffle 152 (which serves as a scum baffle as well as to separate the clarifier and aeration basin) and another scum baffle 180 secured to and extending radially inwardly slightly from launder 158. Scum pushed by the skimmer plate 174 is removed at scum box 182 which occupies a short portion of the circumference of the clarifier between baffle 152 and scum baffle 180. As best shown in FIG. 13, the scum box 182 includes an upwardly sloping entrance ramp 184 which commences below the water level and extends above the water level, an opening 186 into which scum falls into a box 187, and a downwardly sloping exit ramp 188 leading down below the water level. The box 187, which carries the ramps 184, 188 is supported from the baffle 150. In use, the hinged skimmer plate 174 moves up the ramp 184, pushing scum ahead of it into opening 186 (while over the opening the skimmer plate is supported by track 190), and the skimmer plate 174 then moves down ramp 188 to resume its skimming functions. Scum is pumped from the box 187 via conduit 192 and scum pump 194. Since the amount of scum involved is small, a small scum pump can be used.

The sludge scraper blades 196 in the FIGS. 11 to 13 embodiment are the same as those previously described, but their support rods 198 can be fixed to the shaft 162 instead of being hinged thereto. The support rods 198 extend, as shown, through the narrow space 199 between the scum baffle 180 and the end of the skimmer plate 174.

Figure 14:
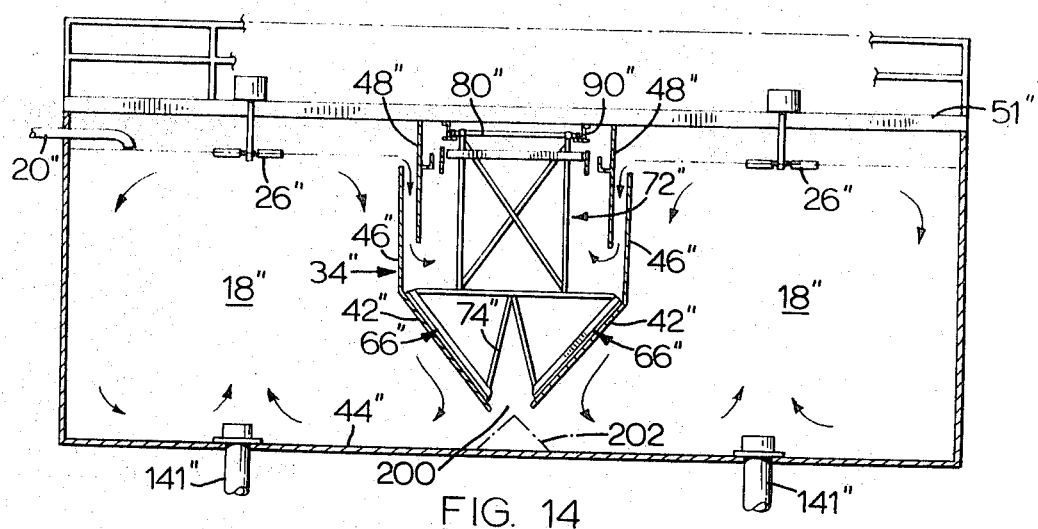
FIG. 14 is a side sectional view of another embodiment of the invention.

If desired, and as shown in FIG. 14 (where double primed reference numerals indicate parts corresponding to those of FIGS. 9 and 10), the shape of the clarifier 34'' can be changed so that its bottom portions 42'' slope downwardly towards each other, instead of downwardly away from each other as shown in FIGS. 9 and 10. The bottom portions 42'' terminate above the bottom 44'' of the aeration basins, leaving a gap 200 into which sludge falls to be picked up by the circulation in the aeration basins. It is found that with this embodiment, considerable agitation is needed to prevent sludge buildup at the space 200 beneath the clarifier. The agitation required can be reduced by providing a fillet 202 steeply triangular in cross-section, which extends along the bottom of the aeration basins below the clarifier outlet. Fillet 202 causes sludge descending from the clarifier to slide into a position where it will be more readily picked up by the circulation in the aeration basins.

Figure 15:
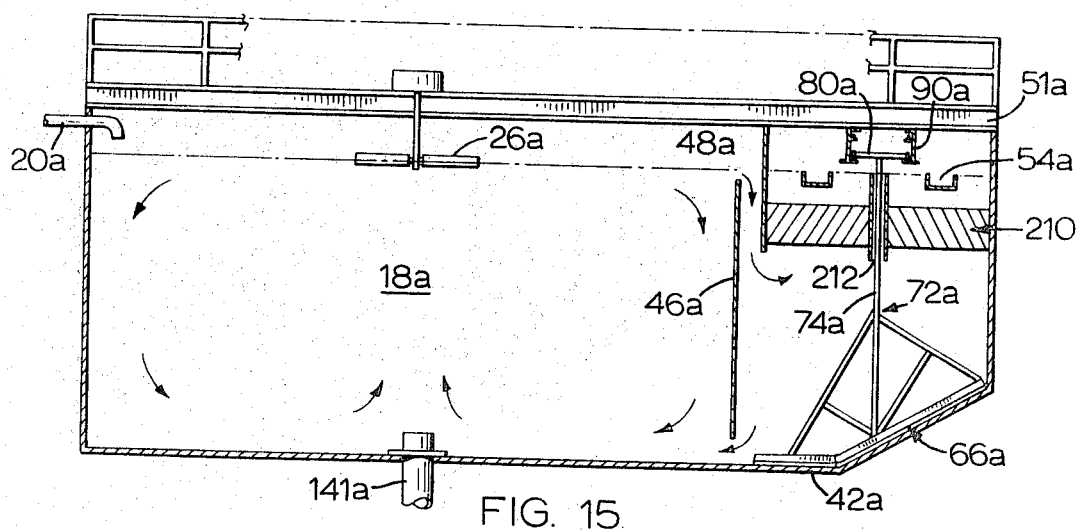
FIG. 15 is a side sectional view of a further embodiment of the invention.

Another modification of the invention is shown in FIG. 15, where reference numerals with the letter $a$ added indicate parts corresponding to those of FIGS. 2 and 3. The FIG. 15 embodiment is similar to that of FIGS. 2 and 3 except that only a portion of its bottom $42a$ is sloped and except that it includes settling tubes or baffles 210. Such settling tubes or baffles, which are entirely conventional, are simply tubes or baffles oriented at an angle of about 60° from horizontal. The walls of the tubes or baffles 210 reduce the effects of turbulence in the clarifier, and sludge settling in the tubes or in the baffles 210 flows down the tubes or baffles and then falls to the bottom of the clarifier. As is well known, this arrangement reduces the area needed for the clarification of a given liquid flow. The arrangement also facilitates use of the system in self-contained treatment units for use on board ships, where considerable motion of the unit can be expected.

In the FIG. 15 embodiment, a single vertical support member $74a$ is used, extending through a slot 212 in the settling tubes, and no scum skimmer is provided. However, a scum skimmer can be provided if desired, or (since the scum floats), a scum skimmer box may be provided at a separate location to skim the scum from the effluent before it is discharged to a receiving stream.

The apparatus shown in FIGS. 2 to 16 may be used, not only as a combined aerator-clarifier, but also as an aerobic digester. Digesters are used to dispose of primary sludge (removed in the primary clarifier 6 of FIG. 1) and excess activated sludge. Some digesters employ an anaerobic process which operates in the absence of oxygen and in which the end products are methane and hydrogen sulphide gases. More modern digesters employ aerobic digestion, which is much faster than anaerobic digestion and in which the end products are water and carbon dioxide, as well as a small amount of solids which do not break down. Conventional aerobic digesters operate on the batch system, in which sludge is pumped into the digester until it is full, the sludge is then aerated, and after a sufficient time has elapsed the aeration is stopped, and the clear liquid is decanted. Eventually solids accumulate and must be removed.

In conventional waste treatment apparatus the level of liquid in the digester varies, because sludge is pumped into the digester at varying times, depending on whether there is too much sludge in the main treatment system at the time in question. Because the level varies, ineffecient diffused air aeration has been used, rather than the more efficient mechanial aeration, because mechanical aeration requires a definite relation between the impeller location and the water level. In some cases floating mechanical aerators have been used, but these tend to jam on their guide poles, causing severe maintenance problems.

According to the invention, any of the embodiments shown in FIGS. 2 to 15 may be used as aerobic digesters, in which sludge is pumped in continuously, aerated for the time required, and clarified liquid is discharged continuously. Solids can be removed continuously via pipe 141. Both the capital and operating costs of such a continuous aerobic digester are substantially lower than that type of aerobic digesters presently available.

Any of the embodiments shown in FIGS. 2 to 15 may also be used for chemical processes, e.g. for water purification or for chemical treatment of waste water. A typical use of this nature is removal of phosphates from waste water. This process is typically conducted by reacting the waste water with lime or other chemicals, thus removing the phosphates as a precipitate. When used in this manner, the required chemicals, such as lime, are fed into the aeration basin, which is now simply a reaction basin, by a chemical feeding unit 213 (FIG. 8) and conduit 214, and precipitated solids are removed via pipe 141.

The following examples will illustrate the type of savings that may be achieved with the use of the invention.

EXAMPLE 1

A chicken processer is presently discharging his waste water to a small stream after only partial treatment in a system of faculative lagoons (a faculative lagoon is a large holding pond in which air reaches the top 2 or 3 feet, and in which micro organisms accordingly operate on the aerobic system in the top 2 or 3 feet and on the anaerobic system in the remainder of the lagoon). The processer has been advised that he must treat this waste water to the point where the B.O.D. content is below 5 mg/L (milligrams per litre) and the phosphate content is below 1 mg/L. (The B.O.D. content of waste water is its biochemical oxygen demand, i.e. the amount of oxygen that would be used by the organic matter in the water.)

Figure 16:
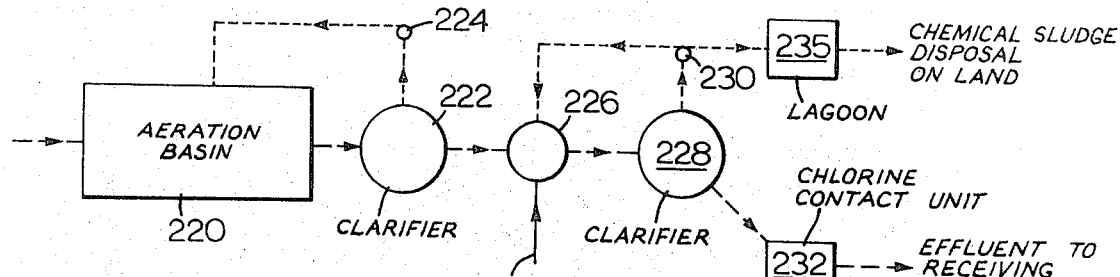
FIGS. 16 and 17 are schematic diagrams comparing a conventional system with the system of the invention for use in treatment of waste water from a chicken processing plant.

The following are the design criteria:
Waste water flow — 150,000 G.P.D. (gallons per day—the term "gallons" as used herein means imperial gallons)
Waste water strength—720 mg/L B.O.D., 55 mg/L phosphate As shown in FIG. 16, a conventional treatment system would include the following treatment units:

1. one aeration basin 220, 100 feet × 50 feet × 18 feet liquid depth equipped with two 25 H.P. mechanical aerators, 2. a circular clarifier 222, 25 feet diameter by 12 feet deep, equipped with a sludge removal mechanism (to clarify effluent from the aeration basin 220), 3. two 100 GPM (gallons per minute) sludge recirculating pumps 224, complete with controls (to recirculate sludge back to aeration basin 220 from clarifier 222), 4. one chemical treatment reaction unit 226, 15 feet diameter by 12 feet deep, equipped with mechanical and chemical feeding units (for phosphate removal; the phosphate is reacted with lime to precipitate calcium phosphate), 5. one circular clarifier 228, 25 feet diameter by 12 feet deep, equipped with a sludge removal mechanism (to remove the precipitate formed in unit 226), 6. two 50 G.P.M. sludge pumps 230, complete with controls, to recirculate some of the precipitate back to the reaction unit 226 (because these reactions normally proceed more efficiently when the solids concentration in the reaction vessel is higher, precipitation occurs using already formed particles as nucleii), 7. one chlorine contact unit 232, 10 feet × 10 feet × 10 feet, complete with chlorine feeding equipment for sterilization (since there are to be no bacteria fed into the receiving stream), 8. a chemical sludge storage lagoon 235 (the chemical sludge or precipitate is disposed of on land).

The total estimated capital cost of this conventional system, as of July, 1971, is about $192,000.00.

Figure 17:
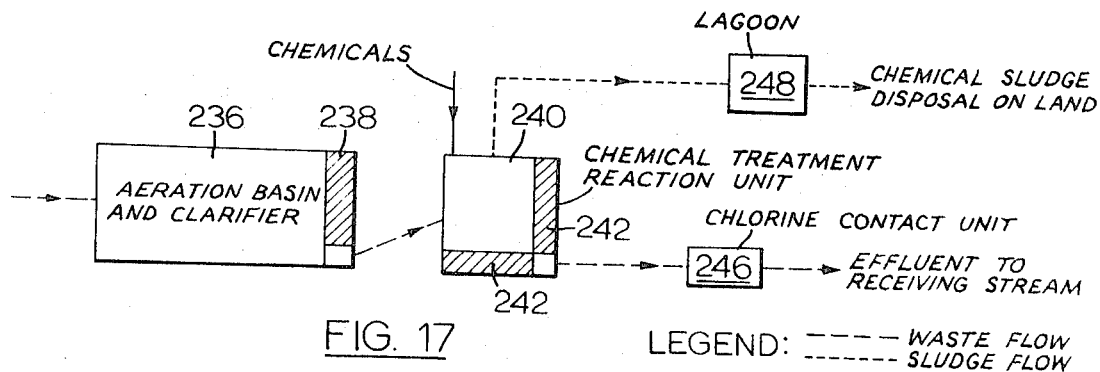

According to the invention, and as shown in FIG. 17, the following treatment units are required:

1. one aeration basin 236, with an integral clarifier 238, both together 110 feet × 50 feet × 18 feet liquid depth, equipped with two 25 H.P. mechanical aerators, 2. one chemical treatment reaction unit 240 with integral clarifiers 242, together 30 feet × 30 feet × 12 feet liquid depth, equipped with a mechanical mixer and chemical feeding units (again for phosphate removal), 3. one chlorine contact unit 246, 10 feet × 10 feet × 10 feet, complete with chlorine feeding equipment, 4. a chemical sludge storage lagoon 248.

The total estimated capital cost of this system is, as of July, 1971, about $147,000.00, and in addition the land requirement is about two thirds that of a conventional system.

EXAMPLE 2

A city having a population of 40,000 persons requires an activated sludge sewage treatment plant. Considering only the major treatment units, the design criteria are:

| | |
|---|---|
| Population | 40,000 persons |
| Flow Design | 4,000,000 G.P.D. |
| Raw Sewage—S. Solids | 200 mg/L |
| B.O.D. | 200 mg/L |
| Desired Treatment Efficiency | 90–95% |
| B.O.D. load | 8,000 pounds of B.O.D. per day (obtained by multiplying the flow rate by the B.O.D. content) |
| B.O.D. Removal by primary treatment | 35% |
| B.O.D. to aeration basin | 5,200 pounds of B.O.D. per day (i.e. the amount remaining after primary settling) |

Figure 18:
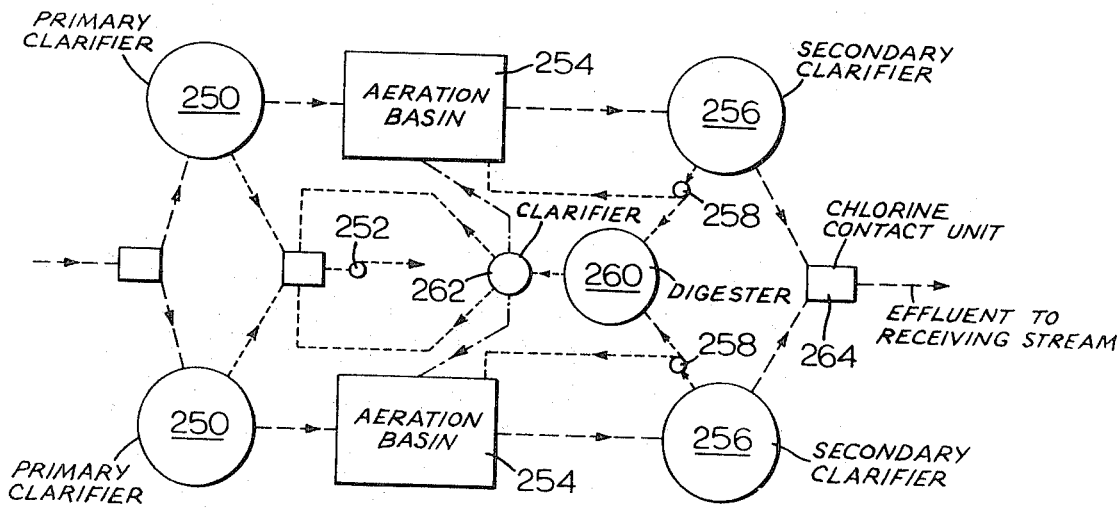
FIGS. 18 and 19 are schematic views comparing a conventional system with the system of the invention for use in a city sewage treatment plant.

As shown in FIG. 18, a conventional treatment system requires the following units:

1. Primary clarifiers: using a standard design clarification rate of 600 gallons per day per square foot of clarification area, two 70 foot diameter by 12 foot deep primary clarifiers 250 are required.

2. Primary sludge pumps: two sludge pumps 252, each 300 gallons per minute complete with controls, are required, for removal of sludge that settles in the primary clarifiers. The raw primary sludge will be disposed of by vacuum filtration and land fill.

3. Aeration basin: assuming a standard design loading rate of 35 lbs. B.O.D. per thousand cubic feet per day, and since the B.O.D. load to the aeration basin is 5,200 lbs. per day, the required volume of aeration basin is 260,000 cubic feet. Therefore, two aeration basins, 254, each 100 feet × 50 feet × 15 feet liquid depth are selected, each aeration basin equipped with two 40 H.P. mechanical aerators.

4. Secondary clarifier: employing again a standard design clarification rate of 600 gal. per day per square foot, two 70 feet diameter by 12 feet deep secondary clarifiers 256 are selected.

5. Secondary sludge return pumps: three pumps 258, each 1,500 G.P.M. and complete with controls, are required.

6. Aerobic digester: sludge solids production is 0.5 × 5,200 = 2,600 lbs. per day (assuming, as is conventional, that for every pound of B.O.D. one-half pound of sludge is produced). Assume that the sludge contains 1.5 percent solids (a standard design criteria), therefore the total sludge production is 174,000 lbs. per day. Assuming 20 days retention time is required in the aerobic digester, this will require 348,000 gal. retention, so that an aerobic digester 260, 55 feet × 55 feet × 18 feet liquid depth is required, with a 40 H.P. mechanical aerator.

7. Clarifier for the aerobic digester: this is required to separate the stabilized solids from the digester supernatant. Assuming a clarification rate of 400 gal. per day per square foot of clarifier surface (a standard criteria for digesters), one clarifier 262, 10 feet diameter by 12 feet deep is required (smallest practical size).

8. One chlorine contact unit 264, with chlorine feeder, is required to treat the effluent before it reaches the receiving stream.

The estimated capital cost of this equipment, as of July, 1971, is about $1,080,000.00, not including sludge filtration and disposal equipment, and not including land costs.

Figure 19:
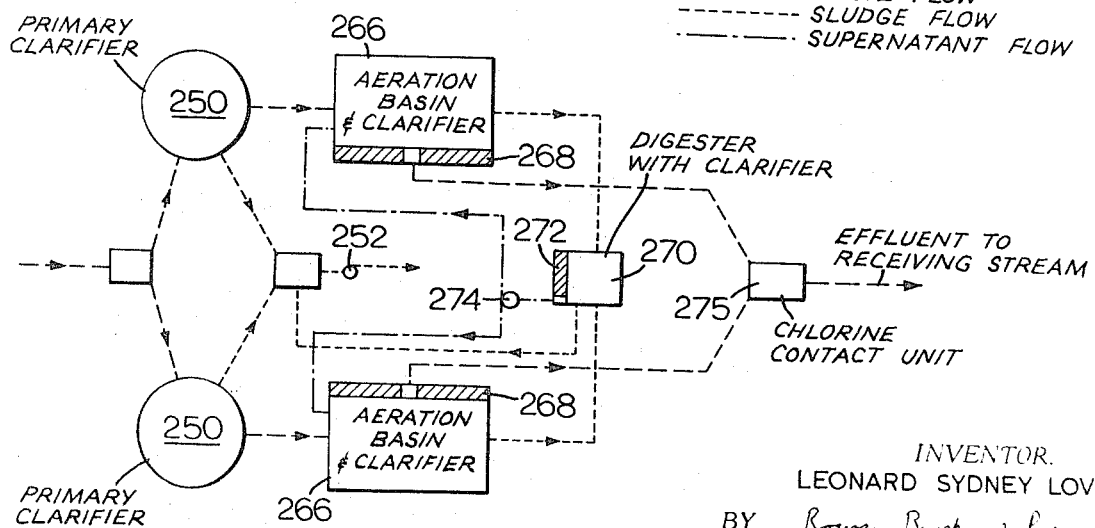

With the invention, the following equipment will typically be used (see FIG. 19):

1. Primary clarifier: the same primary clarifiers 250 are used for the conventional process.

2. Primary sludge pump: the same primary pumps 252 are used as for the conventional process.

3. Two aeration basins 266, each with an integral clarifier 268 and each equipped with two 40 H.P. mechanical aerators, each combined aeration basin and clarifier being 85 feet by 100 feet by 15 feet liquid depth.

4. Aerobic digester 270 with an integral clarifier 272 for continuous clarification of the stabilized sludge, both together 55 feet by 60 feet by 18 feet liquid depth.

5. One 100 gal. per minute supernatant return pump 274, to pump clear supernatant from the digester back to the aeration basins.

6. One chlorine contact unit 275 for sterilization.

The estimated total capital cost of this equipment, as of July, 1971, is about $835,000.00, and the land requirements are about two thirds of the conventional system. If the primary clarifiers 250 are eliminated, as can be achieved with the use of the invention, then the savings in capital costs are of the order of 50 percent.

In use, the invention will preferably employ a quadrilateral clarifier tank (square or rectangular) which will be fabricated in modular sections and joined in the field to provide an adequate clarification area. The aeration basin itself will typically be fabricated of concrete or steel, or it may be an earthen lagoon, as will be described. For example, clarifier tank sections may be fabricated in ten foot units each having 100 square feet of clarifier surface, and the required number of tank sections will simply be fastened together to form a clarifier of required size. The length of chains 86 can readily be adjusted to suit the selected clarifier length. For example, in FIGS. 2 and 3, the clarifier 34, which is typically 10 feet × 10 feet × 20 feet deep at its deepest point, consists of two modular sections 278. The modular sections are joined in any desired manner, and the baffles may be formed from fibreglass sheets cut to desired length. A major advantage of this type of modular construction is that the need for custom engineering drawings and design work for each unit is largely eliminated.

Figure 20:
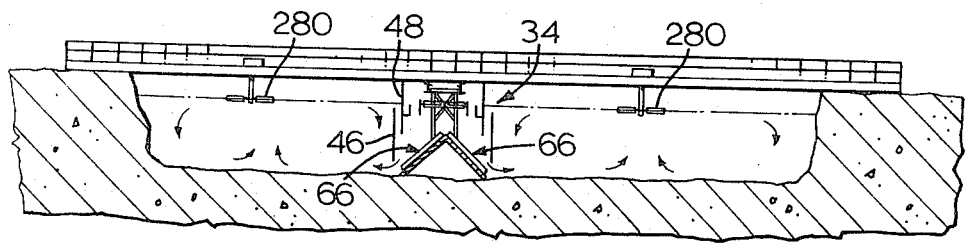
FIG. 20 is a side sectional view illustrating a further application of the invention.

In some cases, e.g. for treatment of waste water from pulp and paper mills, a clarifier such as that illustrated in FIGS. 9 and 10 or in FIG. 14 can be placed in the centre of a large lagoon as shown diagrammatically at 34 in FIG. 20, with a pair of mechanical aerators 280 located in the lagoon. Such a system is particularly useful for pulp and paper mills, which presently commonly solve their waste water disposal problems by constructing large area lagoons having a retention time of about five days. For a pulp and paper mill having a discharge of 50,000,000 gals of water per day, such a lagoon would require a capacity of 250,000,000 gals. and at 16 foot liquid depth would occupy about 65 acres of land. A number of operating problems are encountered with such a system, one of the most serious of which is freezing during winter operation. In addition, such systems do not employ clarifiers and provide only about 75 percent B.O.D. removal and less than 50 percent solids removal. After about 18 months of operation, the treatment efficiency of such a lagoon falls to zero, as the lagoon fills.

By incorporating the clarifier 34 into such a lagoon as shown in FIG. 20, a much higher degree of treatment can be obtained with only one day retention in the lagoon. Therefore the required area for the treatment plant, including the modified clarifier, is only about 15 acres. The treatment efficiency of this system is about 90 percent B.O.D. and suspended solids removal. The capital cost of such a system is about the same as that of a conventional syytem, since a clarifier is needed and since sludge removal apparatus (not shown) is also needed, offsetting the reduction in land costs (land is usually relatively inexpensive in the area of pulp and paper mills). However, the major advantages are that no freezing occurs (since the retention time in the system is only one day and since the waste effluent from the mill is usually about 80°F), less land is destroyed by the lagoons, and the treatment efficiency remains high at all times.

What I claim is:

1. Treatment apparatus comprising:
   a. a reaction basin for containing a liquid to be treated,
   b. means for conducting influent to said reaction basin at a selected rate of flow,
   c. a mechanical agitator and support structure connected between said agitator and said reaction basin for supporting said agitator in a position substantially centered in said reaction basin and at the surface of the liquid in said reaction basin, to agitate the contents of said reaction basin in a circulation pattern in which liquid flows outwardly at the top of said reaction basin, down the sides of said reaction basin, inwardly at the bottom of said reaction basin and upwardly at the centre of said reaction basin,
   d. a clarifier connected to said reaction basin, said clarifier having a lower surface sloping at least in part towards said reaction basin for material settling on said lower surface to tend to slide towards said reaction basin,
   e. baffle means between said reaction basin and said clarifier to permit limited flow of liquid from said reaction basin into a lower area of said clarifier and to permit return of sludge along said lower surface of said clarifier to said reaction basin, said baffle means comprising:
      i. an inner vertical clarifier baffle extending from above the normal liquid level in said clarifier to a position substantially below said liquid level,
      ii. an outer vertical clarifier baffle located on the reaction basin side of said inner baffle and having a portion extending from below said liquid level to a position above the lower surface of said reaction basin, said inner and outer baffles defining a vertical passage between them through which liquid may flow from said reaction basin to said clarifier,
      iii. and a plurality of adjustable flow control gates mounted atop said outer baffle and projecting above said liquid level for adjustably controlling flow of liquid in said reaction basin over said outer baffle and downwardly between said inner and outer baffles and for adjustably limiting the rate of such flow to between two and three times said selected rate of flow,
   f. a sludge scraper in said clarifier for scraping sludge periodically from said lower surface of said clarifier, said sludge scraper including a plurality of scraper blades extending beneath said vertical passage, at least one vertical support member extending upwardly from said scraper blades, and means mounting said support member for movement of said scraper blades over said lower surface of said clarifier,
   g. a scum skimmer fixed to said sludge scraper for movement therewith, for removing scum from said clarifier,
   h. a scum box connected to said clarifier to receive scum skimmed therefrom, said scum box having a ramp located in said clarifier and sloping upwardly therefrom, and an opening at the upper end of said ramp to receive scum pushed up said ramp,
   i. said scum skimmer including a first skimmer blade fixed to said support member, a second skimmer blade, and means hingedly connecting said second skimmer blade to said support member at a position in front of said first skimmer blade so that during skimming movement of said scum skimmer, said second skimmer blade may be pushed up said ramp and will pivot as it travels up said ramp.

2. Apparatus according to claim 1 including a pair of said reaction basins, each being square or rectangular, with said clarifier being located between said aeration basins.

3. Apparatus according to claim 1 including a plurality of said clarifiers, located along at least two sides of said reaction basin.

4. Apparatus according to claim 1 wherein said reaction basin is circular in plane and said clarifier is an annular ring around the outside of said reaction basin, the lower surface of said clarifier thereby being an annular surface sloping at least in part downwardly towards said reaction basin.

5. Apparatus according to claim 1 wherein the slope of said bottom surface is between 20° and 60°.

* * * * *

UNITED STATES PATENT OFFICE
CERTIFICATE OF CORRECTION

Patent No. 3,788,477      Dated January 29, 1974

Inventor(s) Leonard Sidney Love

It is certified that error appears in the above-identified patent and that said Letters Patent are hereby corrected as shown below:

Column 14, line 2,
Claim 1 - feature (e)(iii) - Amend "two and three times" to "one and two times".

Signed and sealed this 3rd day of December 1974.

(SEAL)
Attest:

McCOY M. GIBSON JR.
Attesting Officer

C. MARSHALL DANN
Commissioner of Patents